(12) United States Patent
Fujisaki

(10) Patent No.: US 7,196,850 B2
(45) Date of Patent: Mar. 27, 2007

(54) ZOOM LENS AND IMAGE PICKUP APPARATUS INCLUDING THE SAME

(75) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/458,561

(22) Filed: Jul. 19, 2006

(65) Prior Publication Data

US 2007/0019302 A1    Jan. 25, 2007

(30) Foreign Application Priority Data

Jul. 22, 2005    (JP)    ............................. 2005-213053

(51) Int. Cl.
G02B 15/14    (2006.01)
(52) U.S. Cl. ...................... 359/682; 359/680; 359/689
(58) Field of Classification Search ................ 359/680, 359/682, 684, 689
See application file for complete search history.

(56) References Cited

U.S. PATENT DOCUMENTS

| 4,303,311 | A | * | 12/1981 | Nakamura | .................. 359/689 |
|---|---|---|---|---|---|
| 5,270,866 | A | | 12/1993 | Oizumi et al. | |
| 5,274,504 | A | | 12/1993 | Itoh | |
| 5,305,148 | A | | 4/1994 | Ikemori et al. | |
| 5,357,374 | A | | 10/1994 | Ohno | |
| 5,850,312 | A | | 12/1998 | Kato et al. | |
| 6,433,937 | B1 | | 8/2002 | Konno | |

FOREIGN PATENT DOCUMENTS

| JP | 63-2171214 A | 11/1988 |
|---|---|---|
| JP | 64-072114 A | 3/1989 |
| JP | 03-004217 A | 1/1991 |
| JP | 04-093812 A | 3/1992 |
| JP | 04-153613 A | 5/1992 |
| JP | 04-179908 A | 6/1992 |
| JP | 05-323190 A | 12/1993 |
| JP | 07-120677 A | 5/1995 |
| JP | 08-190132 A | 7/1996 |
| JP | 11-249201 A | 9/1999 |
| JP | 2000-267002 A | 9/2000 |
| JP | 2000-330024 A | 11/2000 |

* cited by examiner

*Primary Examiner*—David N. Spector
(74) *Attorney, Agent, or Firm*—Canon USA, Inc. Intellectual Property Division

(57) ABSTRACT

At least one exemplary embodiment is directed to a zoom lens which includes, in order from an object side to an image side, a first lens unit, which can have a negative refractive power; a second lens unit, which can have a positive refractive power; and a third lens unit, which can have a negative refractive power. The second and third lens units can move in zooming. The first, second, and third lens units can satisfy the following conditions:

$$1.2 < \phi 1/\phi T < 2$$

$$0.9 < \phi 2/\phi T < 2.2$$

$$0.75 < \phi 3/\phi 1 < 1.2$$

wherein $\phi 1$, $\phi 2$, and $\phi 3$ are the refractive powers of the first, second, and third lens units, respectively, and $\phi T$ is the refractive power of the zoom lens at a telephoto end.

7 Claims, 9 Drawing Sheets

ZOOM LENS AND IMAGE PICKUP APPARATUS INCLUDING THE SAME

BACKGROUND OF THE INVENTION

1. Field of the Invention

The present invention relates to zoom lenses, and particularly, though not exclusively, relates to an ultra-compact zoom lens.

2. Description of the Related Art

One of the frequently used wide-angle zoom lenses is a three-unit zoom lens including, in order from an object side to an image side, a lens unit with a negative refractive power, a lens unit with a positive refractive power, and another lens unit with a negative refractive power. The three lens units are moved in zooming. This type of zoom lens can relatively easily provide a wide angle of view.

Japanese Patent Laid-Open Nos. 63-271214 and 64-72114 discuss zoom lenses including three lens units that have specific lens configurations and are moved under predetermined conditions in zooming. These zoom lenses include eight or nine lenses, have an angle of view of about 62° at a wide-angle end, and can successfully correct and/or reduce variations in aberration due to zooming.

According to the two publications, each of the lens units includes at least two lenses to achieve a higher power and thus reduce the total lens length (the distance from the first lens surface to an image plane) while correcting and/or reducing chromatic aberration within the lens unit itself.

Japanese Patent Laid-Open No. 4-153613 discusses a zoom lens including three or four lenses in total and having an angle of view of about 62° at a wide-angle end.

Japanese Patent Laid-Open No. 4-93812 discusses a zoom lens including four lenses in total and having an angle of view of about 58° at a wide-angle end. The zoom lenses above include three lens units, each including one or two lenses. The lenses of the lens units can be arranged substantially symmetrically during zooming and are formed of appropriate materials. The three lens units can thus reduce the total lens length while correcting and/or reducing aberrations including chromatic aberration with a good balance between the three lens units.

Japanese Patent Laid-Open No. 5-323190 discusses a zoom lens including three lenses that have appropriate shapes and can be arranged appropriately in terms of refractive power (the reciprocal of focal length) to reduce the amount of movement of each lens unit in zooming. This zoom lens can achieve an angle of view of about 74° at a wide-angle end with the three lenses.

Japanese Patent Laid-Open No. 7-120677 discusses a zoom lens including five lenses in total and having a first lens unit with a lower negative refractive power and a third lens unit with an appropriate negative refractive power. This zoom lens can successfully correct and/or reduce variations in chromatic aberration due to zooming and achieve a wider angle of view of about 73° at a wide-angle end with the five lenses.

Japanese Patent Laid-Open No. 2000-267002 discusses optical systems whose magnification changes with object distance, such as endoscope objective optical systems. A compact optical system according to an embodiment described in the publication includes fewer lenses and can achieve an angle of view exceeding 130° at a wide-angle end.

In addition, the optical system includes lens units arranged appropriately in terms of refractive power to inhibit and/or reduce variations in astigmatism due to the movement of a second lens unit, which can have a positive refractive power. These lens units can thus reduce the total lens length and achieve a wider angle of view.

An optical system including five lenses according to another embodiment of the reference causes about 50% of negative distortion to achieve an angle of view of 130° or more at a wide-angle end.

Japanese Patent Laid-Open No. 2000-330024 discusses a zoom lens for endoscope objective optical systems. This zoom lens includes five or six lenses and provides an angle of view exceeding 120°. According to this publication, the zoom lens causes about 50% of negative distortion at a wide-angle end to achieve an angle of view of about 122° with the five or six lenses.

Japanese Patent Laid-Open No. 3-4217 discusses real-image finder optical systems with variable magnification including three to five lenses. A real-image finder with variable magnification according to an embodiment described in the publication includes five lenses and has an angle of view of about 58° at a wide-angle end.

This system includes a second lens unit, which can have a positive refractive power to serve as the main component for changing magnification, and a third lens unit, which can have a low negative refractive power to correct and/or reduce the shift of an image plane due to changes in magnification. The third lens unit is composed of a single lens to reduce the size of the entire system.

In this system, a field frame is disposed inside an erecting prism to compensate for the disadvantage of a long back focus due to the low power of the third lens unit.

Japanese Patent Laid-Open No. 4-179908 discusses a real-image finder with variable magnification including four lenses and having an angle of view of about 56° at a wide-angle end. This finder includes a first lens unit, a second lens unit that is moved to change magnification, and a third lens unit, which can have a low power to correct and/or reduce the shift of an image plane due to changes in magnification.

The first and second lens units can be arranged appropriately in terms of power and include aspherical lens surfaces to successfully correct aberrations such as spherical aberration with the four lenses.

Japanese Patent Laid-Open No. 8-190132 discusses a Keplerian finder with variable magnification including three lenses and having an angle of view of about 51° at a wide-angle end. The power of each lens unit is appropriately adjusted to achieve an angle of view of about 51° at a wide-angle end with the three lenses.

Japanese Patent Laid-Open No. 11-249201 discusses a zoom finder including three or four lenses. According to this publication, the zoom finder includes a combination of glass and plastic lenses to achieve an appropriate diopter over a wide temperature range with high magnification.

Recently, the market for zoom lenses including fewer lenses and having a smaller total lens length, for example for cameras for use in cellular phones and compact digital cameras to achieve the size reduction of the entire apparatus, has increased. In addition, the demand for zoom lenses having wider angles of view, particularly over 80°, have also increased.

In general, a lens unit including more lenses is longer along the optical axis, and a zoom lens including lens units having larger amounts of movement in zooming has a longer total lens length. Thus, it is difficult to reduce the size of the entire lens system in such a zoom lens.

A negative-lead zoom lens including a frontmost lens unit having a negative refractive power is useful as a wide-angle zoom lens. It can be useful for this type of zoom lens to arrange lens units appropriately in terms of refractive power. If the arrangement of the lens units is inappropriate in terms of refractive power, the zoom lens has difficulty in achieving excellent optical performance over the entire range of magnification with a wider angle of view using fewer lenses and a simpler lens structure.

SUMMARY OF THE INVENTION

At least one exemplary embodiment is directed to an ultra-compact zoom lens with high optical performance for use in compact image pickup apparatuses (e.g., digital still cameras, cellular phones, and personal digital assistants (PDAs), and other image pickup apparatus as known by one of ordinary skill in the relevant art and equivalents).

At least one exemplary embodiment is directed to a zoom lens that includes fewer lenses and, which can have a desired zoom ratio and high optical performance. At least one further exemplary embodiment includes an image pickup apparatus including such a zoom lens.

A zoom lens according to at least one exemplary embodiment includes, in order from an object side to an image side, a first lens unit which can have a negative refractive power; a second lens unit which can have a positive refractive power; and a third lens unit which can have a negative refractive power. The second and third lens units move in zooming. The first, second, and third lens units each include one or more lenses having refractive powers of the same sign. The first, second, and third lens units can satisfy the following conditions:

$$1.2 < |\phi1/\phi T| < 2$$

$$0.9 < \phi2/\phi T < 2.2$$

$$0.75 < \phi3/\phi1 < 1.2$$

wherein $\phi1$, $\phi2$, and $\phi3$ are the refractive powers of the first, second, and third lens units, respectively, and $\phi T$ is the refractive power of the zoom lens at a telephoto end.

Further features of the present invention will become apparent from the following description of exemplary embodiments with reference to the attached drawings.

DESCRIPTION OF THE EMBODIMENTS

Figure 1A:
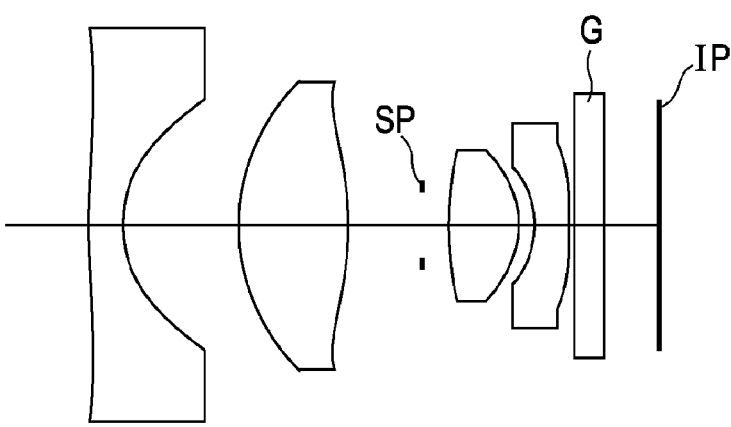
FIGS. 1A to 1C are sectional views of a zoom lens according to a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non-limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Zoom lenses and an image pickup apparatus including a zoom lens according to exemplary embodiments of the present invention will now be described.

Figure 1B:
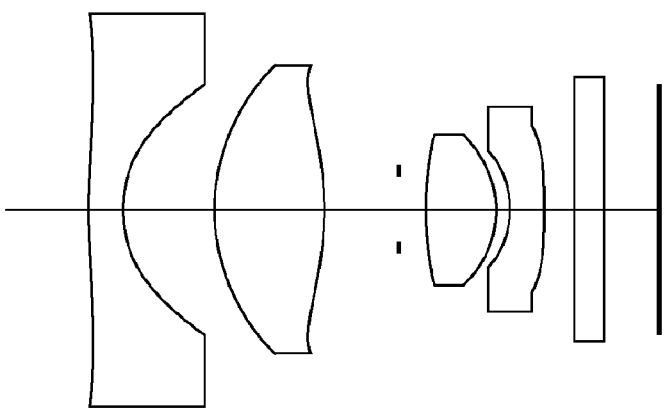
Figure 1C:
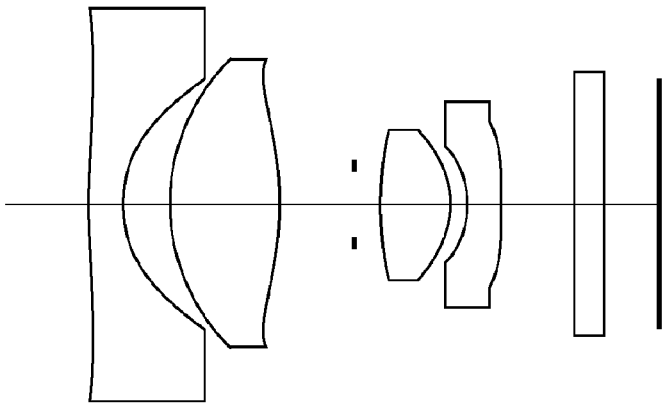
Figure 2A:
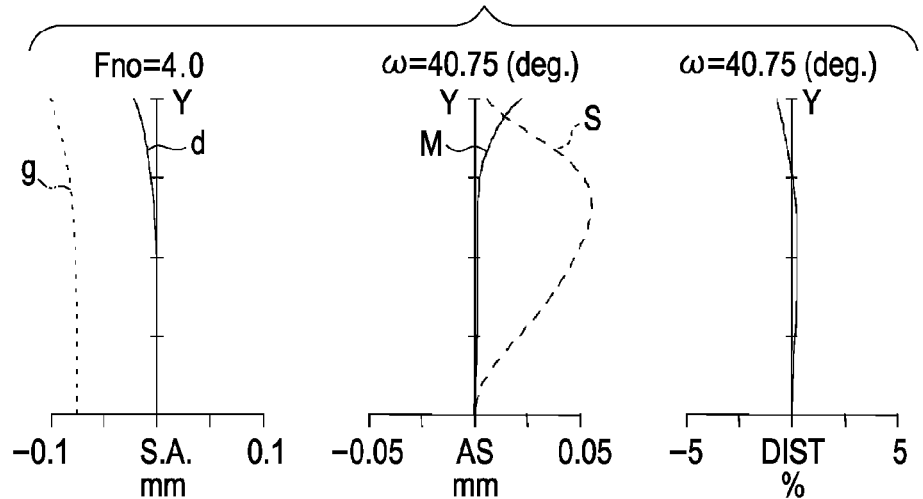
FIGS. 2A to 2C are graphs showing aberrations in the first exemplary embodiment of the present invention.
Figure 2B:
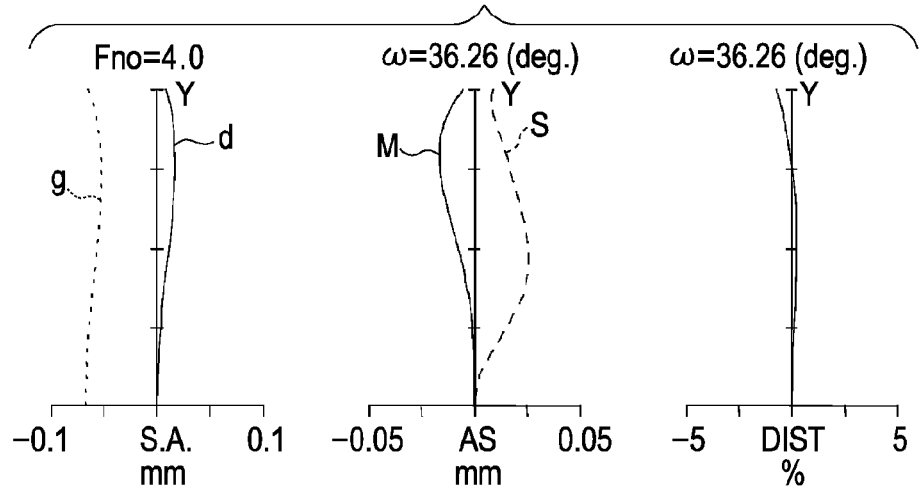
Figure 2C:
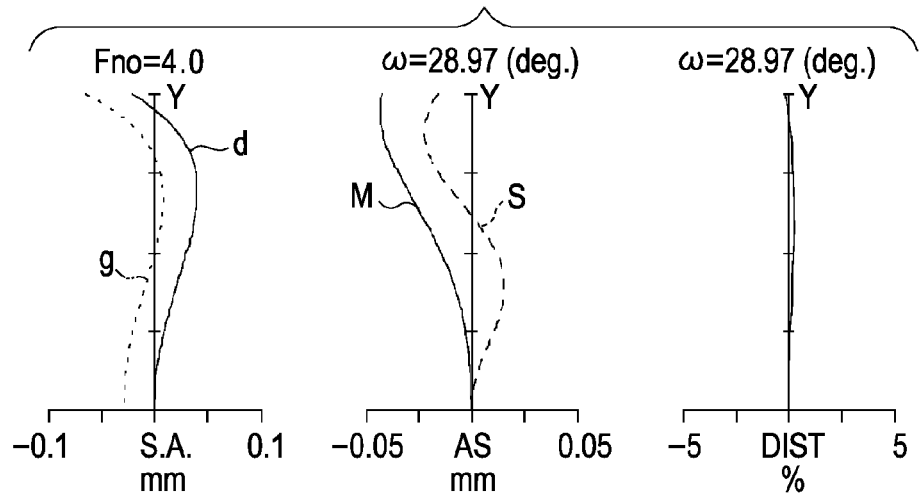

FIGS. 1A to 1C are sectional views of a zoom lens according to a first exemplary embodiment at a wide-angle end, an intermediate zoom position, and a telephoto end, respectively. FIGS. 2A to 2C are graphs showing aberrations occurring in the zoom lens according to the first exemplary embodiment at the wide-angle end, the intermediate zoom position, and the telephoto end, respectively. The zoom lens according to the first exemplary embodiment can have a zoom ratio of 1.56× and an aperture ratio of 4.0.

Figure 3A:
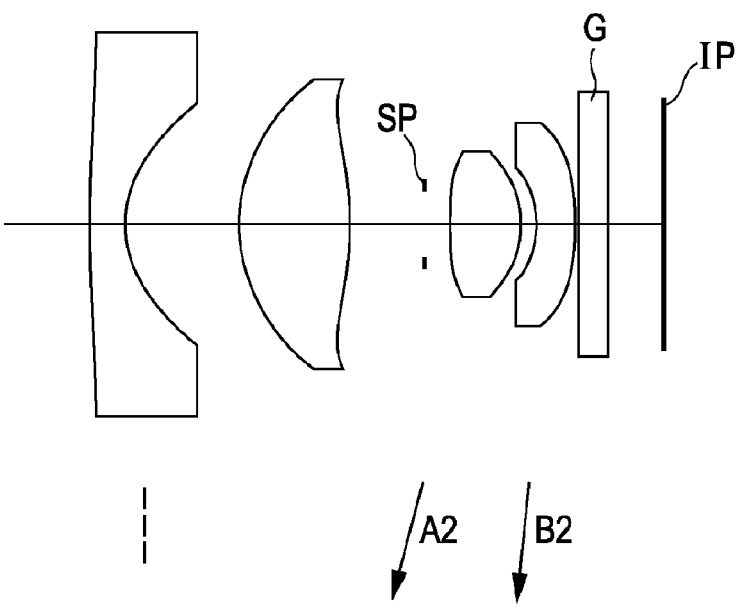
FIGS. 3A to 3C are sectional views of a zoom lens according to a second exemplary embodiment of the present invention.
Figure 3B:
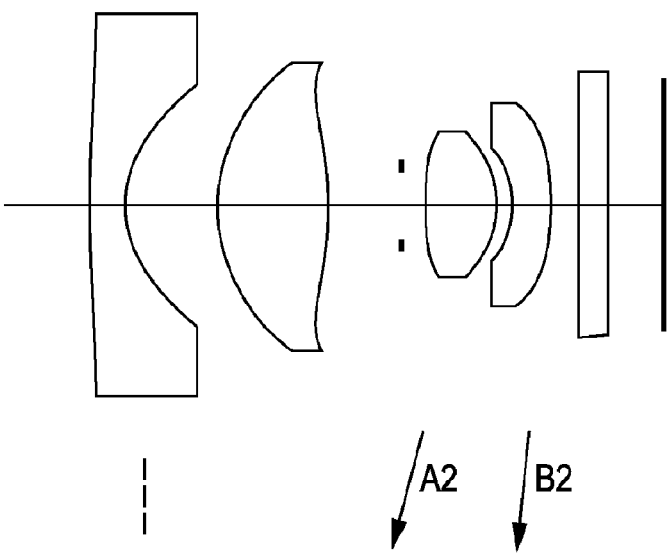
Figure 3C:
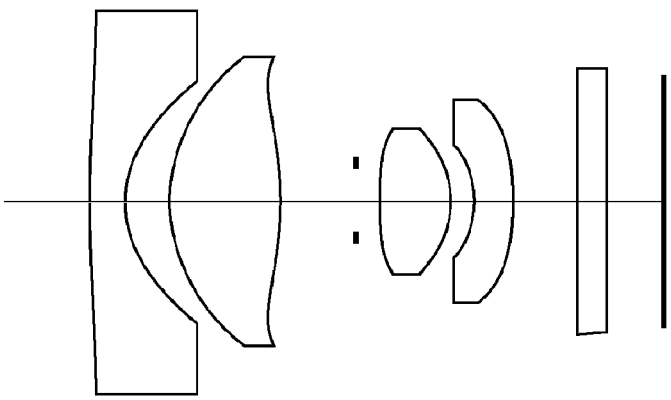
Figure 4A:
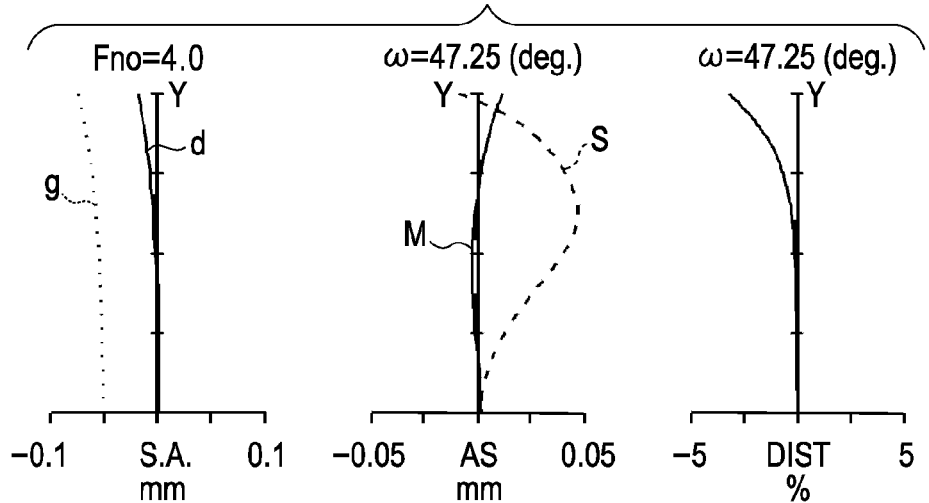
FIGS. 4A to 4C are graphs showing aberrations in the second exemplary embodiment of the present invention.
Figure 4B:
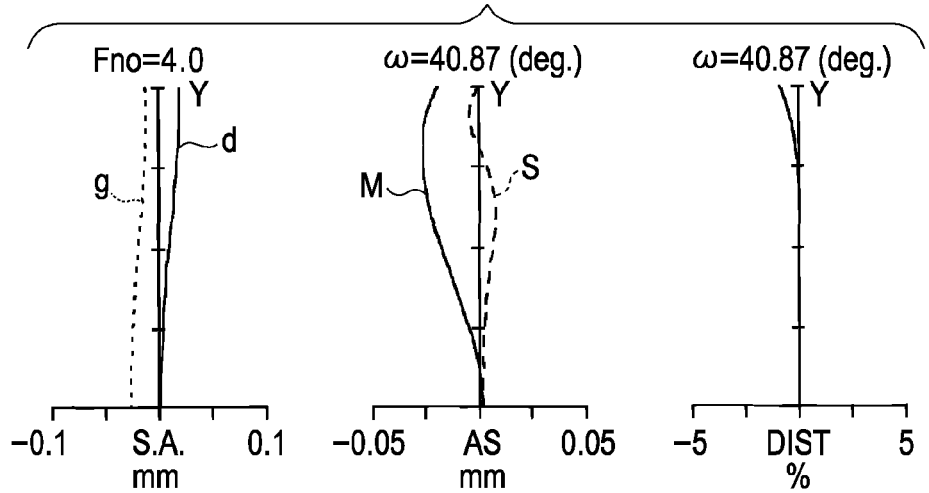
Figure 4C:
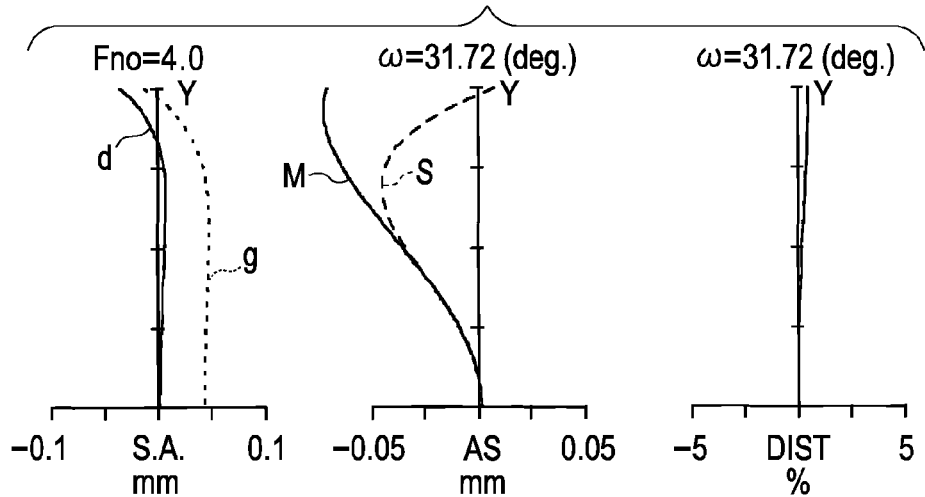

FIGS. 3A to 3C are sectional views of a zoom lens according to a second exemplary embodiment at the wide-angle end, the intermediate zoom position, and the telephoto end, respectively. FIGS. 4A to 4C are graphs showing aberrations occurring in the zoom lens according to the second exemplary embodiment at the wide-angle end, the intermediate zoom position, and the telephoto end, respectively. The zoom lens according to the second exemplary embodiment can have a zoom ratio of 1.75× and an aperture ratio of 4.

Figure 5A:
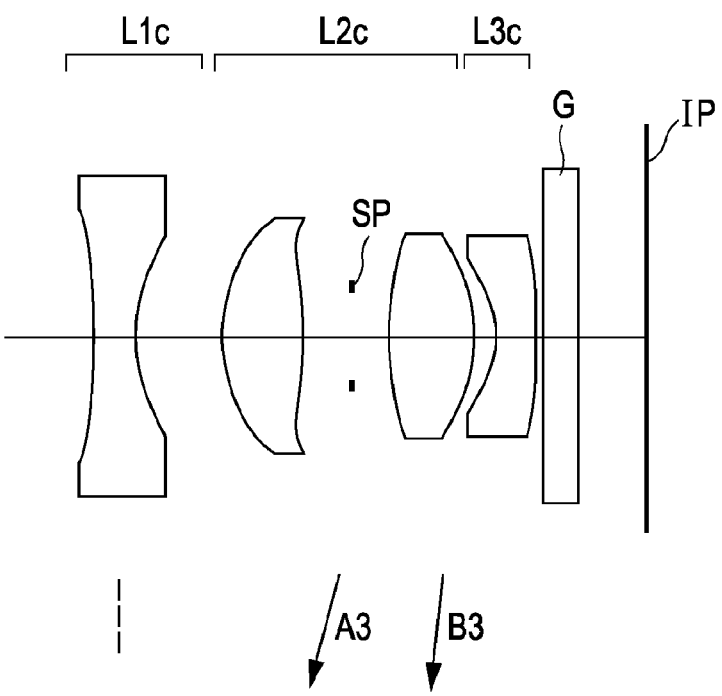
FIGS. 5A to 5C are sectional views of a zoom lens according to a third exemplary embodiment of the present invention.
Figure 5B:
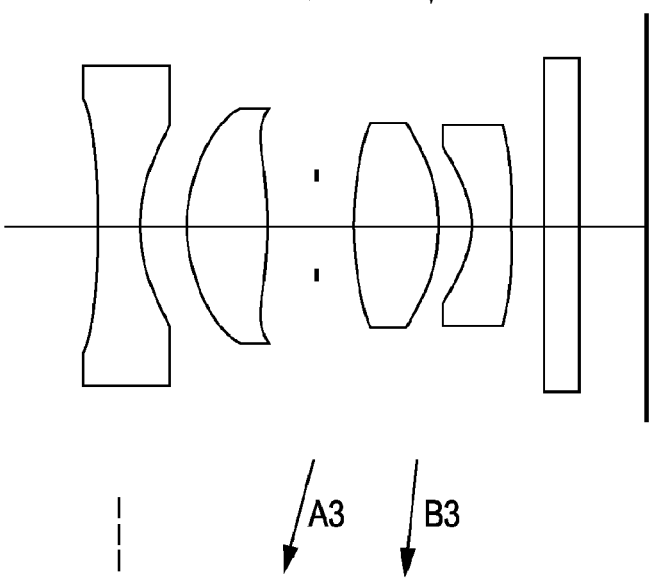
Figure 5C:
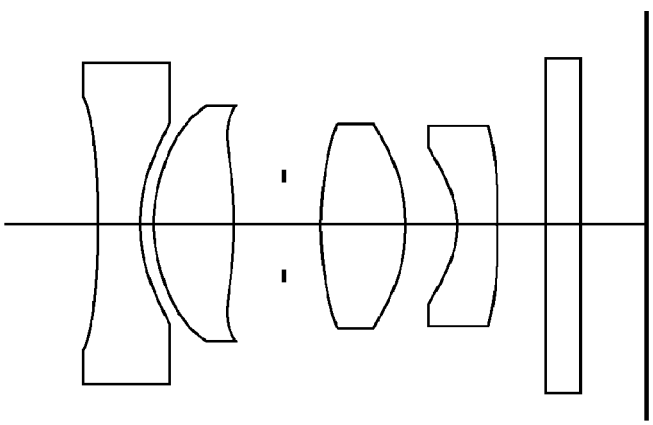
Figure 6A:
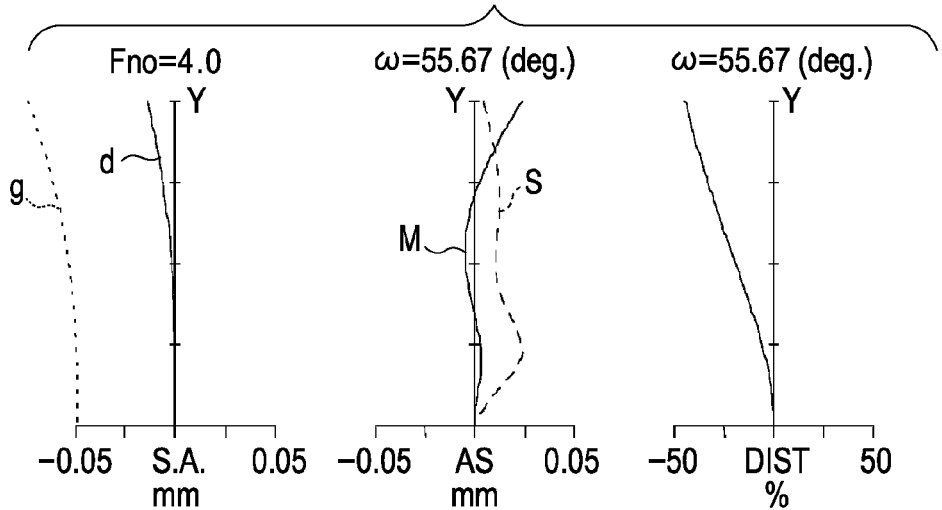
FIGS. 6A to 6C are graphs showing aberrations in the third exemplary embodiment of the present invention.
Figure 6B:
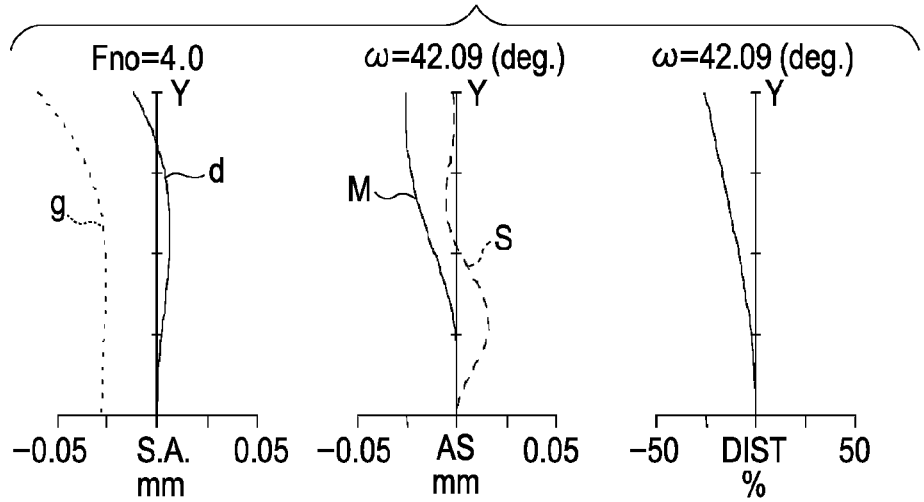
Figure 6C:
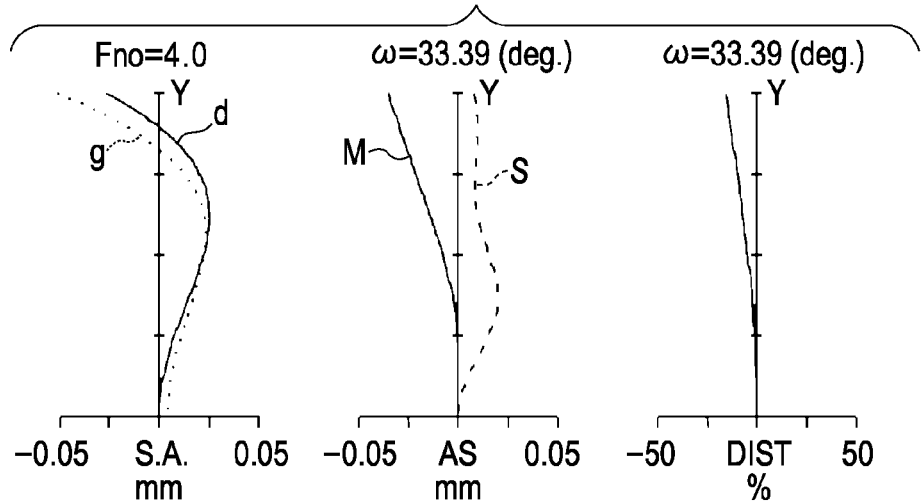

FIGS. 5A to 5C are sectional views of a zoom lens according to a third exemplary embodiment at the wide-angle end, the intermediate zoom position, and the telephoto end, respectively. FIGS. 6A to 6C are graphs showing aberrations occurring in the zoom lens according to the third exemplary embodiment at the wide-angle end, the intermediate zoom position, and the telephoto end, respectively. The zoom lens according to the third exemplary embodiment can have a zoom ratio of 1.61× and an aperture ratio of 4.

Figure 7A:
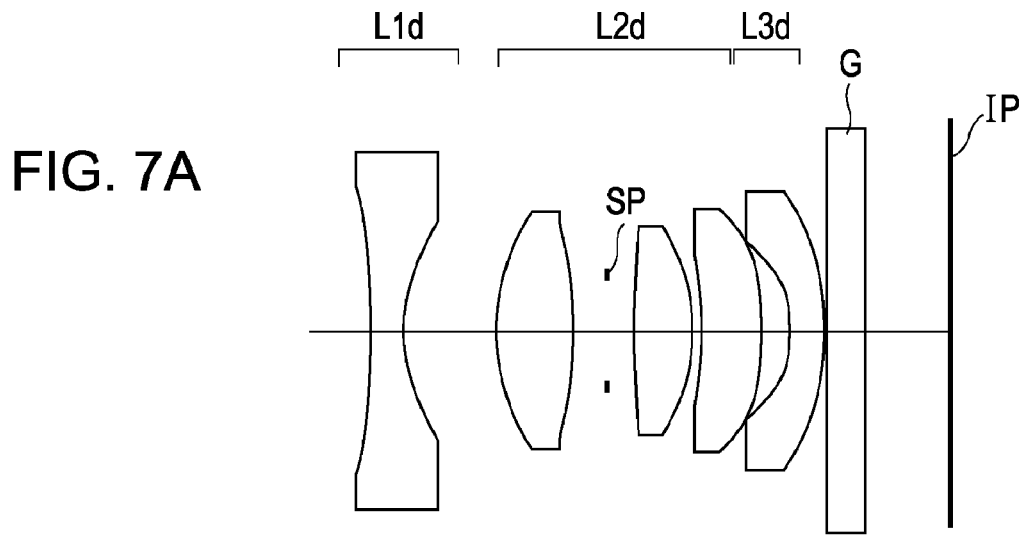
FIGS. 7A to 7C are sectional views of a zoom lens according to a fourth exemplary embodiment of the present invention.
Figure 7B:
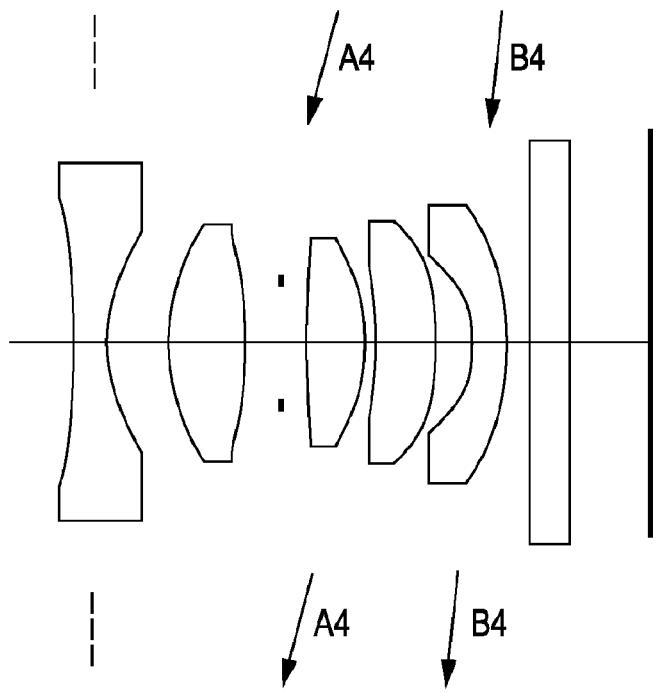
Figure 7C:
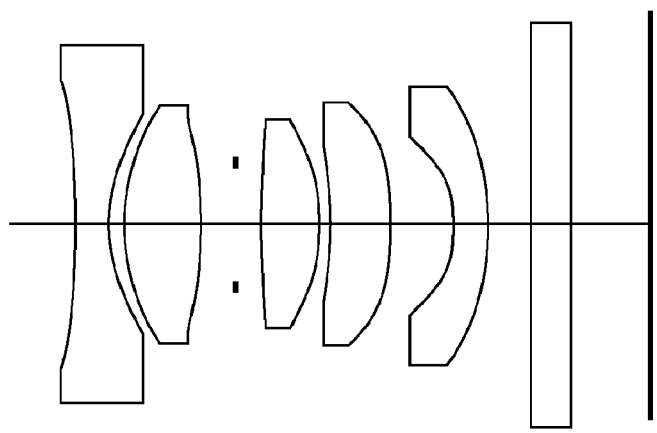
Figure 8A:
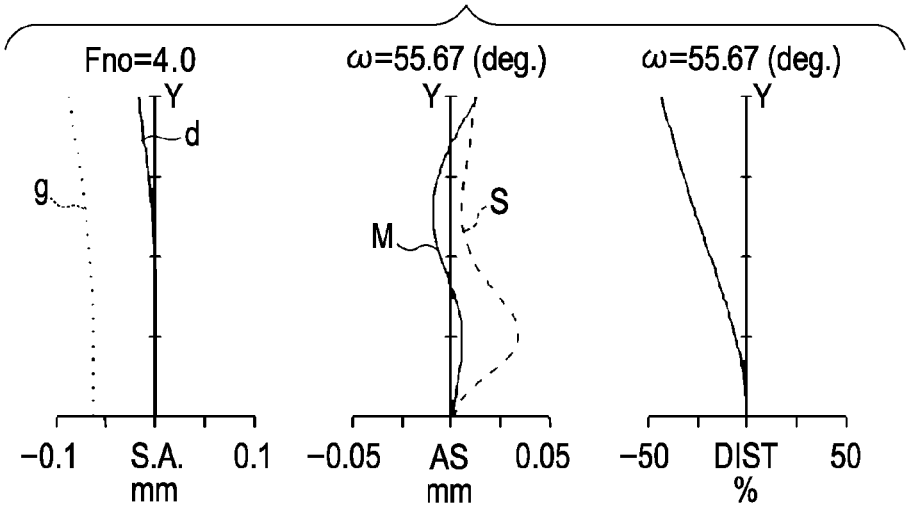
FIGS. 8A to 8C are graphs showing aberrations in the fourth exemplary embodiment of the present invention.
Figure 8B:
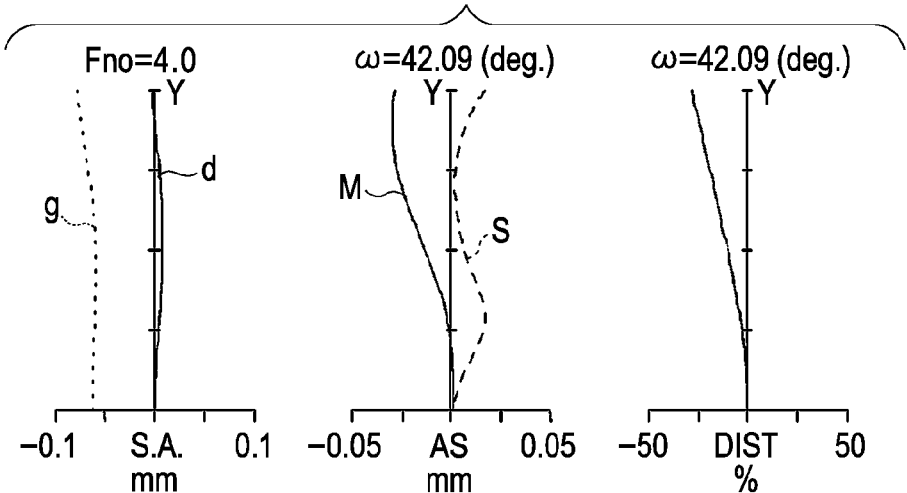
Figure 8C:
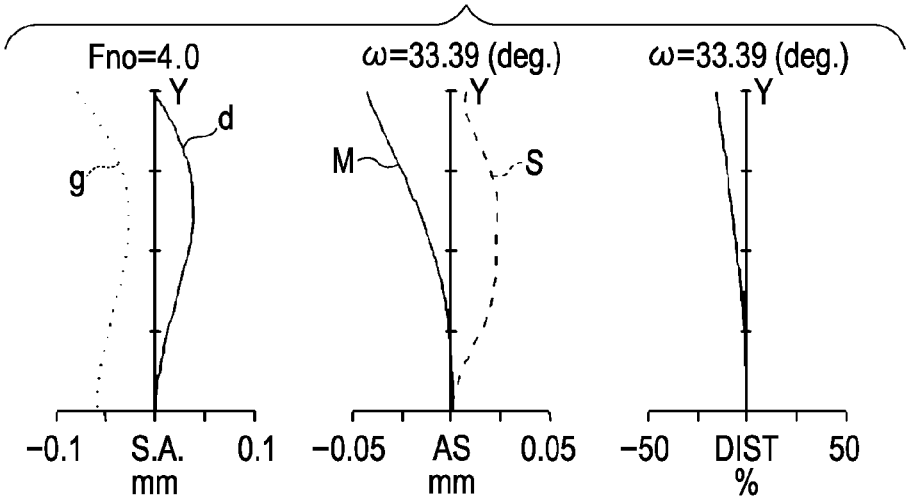

FIGS. 7A to 7C are sectional views of a zoom lens according to a fourth exemplary embodiment at the wide-angle end, the intermediate zoom position, and the telephoto end, respectively. FIGS. 8A to 8C are graphs showing aberrations occurring in the zoom lens according to the fourth exemplary embodiment at the wide-angle end, the intermediate zoom position, and the telephoto end, respectively. The zoom lens according to the fourth exemplary embodiment can have a zoom ratio of 1.61× and an aperture ratio of 4.

Figure 9:
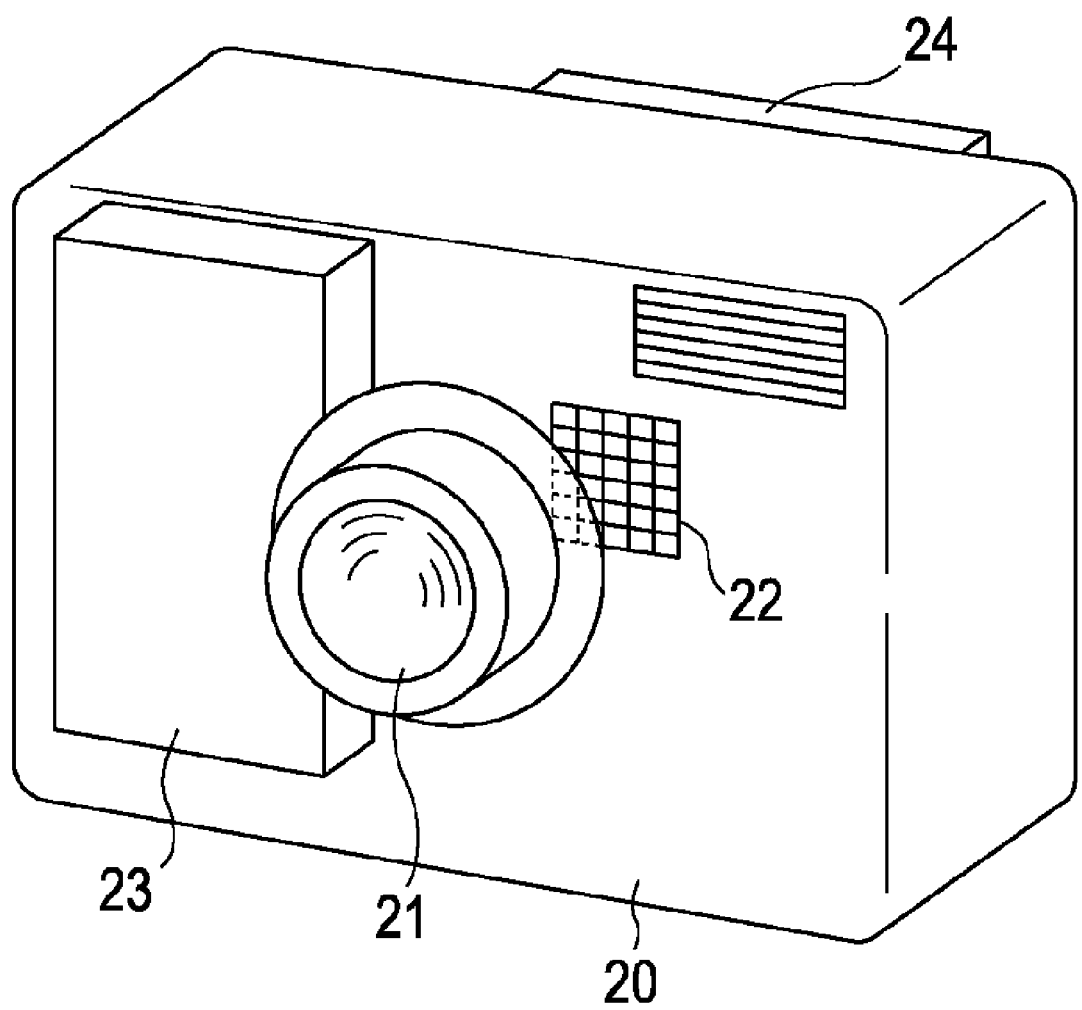
FIG. 9 is a schematic diagram of an image pickup apparatus according to an exemplary embodiment of the present invention.

FIG. 9 is a schematic diagram of an image pickup apparatus including a zoom lens according to at least one exemplary embodiment.

The zoom lenses according to the exemplary embodiments are imaging lens systems that can be used in image pickup apparatuses (optical devices). In the sectional views, the left side of the zoom lens is an object side, and the right side is an image side.

In the sectional views, the zoom lenses each include a first lens unit L1a–d which can have a negative refractive power (an optical power represented as the reciprocal of focal length), a second lens unit L2a–d which can have a positive refractive power, and a third lens unit L3a–d which can have a negative refractive power.

The zoom lenses further include an aperture stop SP in the second lens unit L2a–d.

The zoom lenses further include an optical block G (e.g., an optical filter, a faceplate, a quartz low-pass filter, and an infrared cut filter) and an image plane IP. If the zoom lenses are used as imaging optical systems for camcorders or digital still cameras, an image pickup surface of a solid-state image pickup element (photoelectric transducer), such as a CCD sensor or a CMOS sensor, is positioned in the image plane IP.

In the graphs of aberrations, S.A. indicates spherical aberration, AS indicates astigmatism, DIST indicates distortion, d and g indicate the d-line and the g-line, respectively, M and S indicate a meridional plane and a sagittal plane, respectively, ω indicates a half-angle of view, and Fno indicates an F-number. Where the Y-axis in the spherical aberration's graph is entrance pupil radius, the Y-axis in the astigmatism's and distortion's graphs is the image height.

In the description of the exemplary embodiments below, the wide-angle end and the telephoto end refer to the zoom positions corresponding to the limits of the range where a lens unit for changing magnification (the second lens unit L2a–d) can be mechanically moved (A1–A4) along the optical axis.

The second lens unit L2a–d moves (A1–A4) to the object side in zooming from the wide-angle end to the telephoto end to serve as the main component for changing magnification. The third lens unit L3a–d moves (B1–B4) (e.g., nonlinearly) to the object side to correct and/or reduce the shift of the image plane IP due to changes in magnification.

The first lens unit L1a–d does not move in zooming. The entire system can move in focusing.

Use of fewer lenses has recently been demanded for reductions in the total lens length and weight of an optical imaging system for use in digital image pickup apparatuses. Lenses having different refractive powers can be used in each lens unit to successfully correct aberration within the lens unit.

This approach, however, increases the number of lenses used and thus increases the total lens length. In general, aberrations occurring in different lens units can be encouraged to cancel each other out to reduce the number of lenses used and thus reduce the total lens length. The three-unit zoom lenses according to the exemplary embodiments include the first lens unit L1a–d which can have a negative refractive power, the second lens unit L2a–d which can have a positive refractive power, and the third lens unit L3a–d which can have a negative refractive power, and each of the lens units L1a–d, L2a–d, and L3a–d includes one or more lenses having refractive powers of the same sign. These zoom lenses can therefore correct and/or reduce aberrations occurring in the lens units L1a–d, L2a–d, and L3a–d with a good balance between the lens units L1a–d, L2a–d, and L3a–d.

Specifically, the first lens unit L1a–d, which can have a negative refractive power, includes a single negative lens, which can have a concave surface on the image side.

The single negative lens can be used to reduce the size and weight of the first lens unit L1a–d because the lens diameter thereof increases with increasing angle of view. In addition, the first lens unit L1a–d does not need to move in zooming so that it does not increase the total lens length in zooming. This simplifies the zooming mechanism.

The second lens unit L2a–d, which can have a positive refractive power, includes two or three positive lenses in total, two of which are positive biconvex lenses. The aperture stop SP is disposed in the second lens unit L2a–d so as to move integrally therewith in zooming.

The aperture stop SP is disposed in the second lens unit L2a–d so that the entire lens system is substantially symmetrical with respect to the aperture stop SP in terms of refractive power. This arrangement allows off-axis aberrations such as lateral chromatic aberration, field curvature, and astigmatism to occur symmetrically, thereby successfully correcting and/or reducing the aberrations.

In addition, this arrangement provides higher aperture efficiency than the case where the aperture stop SP is disposed on the object side of the lens system. This arrangement thus inhibits the decrease in peripheral brightness, one of the disadvantages of wide-angle lenses.

The third lens unit L3a–d, which can have a negative refractive power, includes a single negative meniscus lens which can have a convex surface on the image side.

The single negative meniscus lens can be used to successfully correct and/or reduce coma aberration. In addition, the meniscus lens reduces differences in the angles at which rays of light impinge on an image pickup surface. When a solid-state image pickup element is used, the meniscus lens can reduce differences in the angles at which rays of light impinge on the overall screen to achieve well-balanced optical performance over the screen.

The zoom lenses according to the exemplary embodiments satisfy the following conditions:

$$1.2 < |\phi 1/\phi T| < 2 \tag{1}$$

$$0.9 < \phi 2/\phi T < 2.2 \tag{2}$$

$$0.75 < \phi 3/\phi 1 < 1.2 \tag{3}$$

wherein $\phi 1$, $\phi 2$, and $\phi 3$ are the refractive powers of the lens units L1a–d, L2a–d, and L3a–d, respectively, and $\phi T$ is the refractive power of the entire system at the telephoto end.

In zooming from the wide-angle end to the telephoto end, the second lens unit L2a–d moves (A1–A4) from the image side to the object side mainly for changing magnification.

The third lens unit L3a–d moves (B1–B4) in such a path that it reduces the total lens length in zooming to correct and/or reduce the shift of the image plane IP due to changes in magnification. The conditions (1) and (2) relate to the ranges of the refractive powers of the lens units L1a–d and L2a–d, respectively, where aberrations can be successfully corrected and/or reduced in this type of zooming.

The amount of movement of the third lens unit L3a–d can be minimized to reduce variations in aberration due to changes in magnification.

The refractive powers of the lens units L1a–d and L2a–d are limited to the ranges specified by the conditions (1) and (2), respectively, to reduce the amount of movement (B1–B4) of the third lens unit L3a–d when the second lens unit L2a–d moves (A1–A4) simply from the image side to the object side in zooming from the wide-angle end to the telephoto end.

Below the lower limit of the condition (1), the first lens unit L1a–d has a low refractive power and thus causes difficulty in achieving a desired zoom ratio. Above the upper limit of the condition (1), the first lens unit L1a–d has an excessive negative refractive power and thus causes difficulty in correcting positive spherical aberration. Below the lower limit of the condition (2), the second lens unit L2a–d has a low refractive power and thus causes difficulty in achieving a desired zoom ratio.

Above the upper limit of the condition (2), the second lens unit L2a–d has an excessive positive refractive power and thus causes difficulty in correcting negative spherical aberration. The condition (3) is intended to achieve a substantially symmetrical arrangement of the lens units L1a–d and L3a–d in terms of refractive power.

Single-lens reflex cameras, for example, require a long back focus to provide the space for incorporating members such as a quick-return mirror on the image side. In general, therefore, a retrofocus power arrangement is employed for wide-angle lenses.

Recent digital image pickup apparatuses, however, can have a shorter back focus. The degree of retrofocus can therefore be lowered to achieve a more symmetrical power arrangement, thereby reducing the size of the entire lens system.

The lens units L1a–d, L2a–d, and L3a–d of the zoom lens can be arranged substantially symmetrically in terms of refractive power. Such an arrangement allows aberrations, including chromatic aberration, field curvature, and spherical aberration, occurring in the lens units L1a–d, L2a–d, and L3a–d to substantially cancel each other out with a good balance between the negative refractive powers of the lens units L1a–d and L3a–d and the positive refractive power of the lens unit L2a–d.

The difference between the refractive powers of the lens units L1a–d and L3a–d becomes large below the lower limit of the condition (3). The first lens unit L1a–d then has a high negative refractive power relative to that of the entire system.

Thus, the zoom lens has a high degree of retrofocus and thus has a long back focus which makes it difficult to reduce the total lens length. In addition, the imbalance between the refractive powers of the lens units L1a–d and L3a–d and that of the lens unit L2a–d can make it difficult to successfully correct and/or reduce aberrations, typically chromatic aberration.

The third lens unit L3a–d has a higher refractive power than the first lens unit L1a–d above the upper limit of the condition (3). Thus, rays of light impinge on the image pickup surface at sharp angles, and thus the zoom lens causes problems such as variations in color for digital image pickup apparatuses. In addition, the imbalance between the refractive powers of the lens units L1a–d and L3a–d and that of the lens unit L2a–d makes it difficult to successfully correct and/or reduce aberrations.

The conditions (1) to (3) can be further limited to the following numerical ranges:

$$1.23 < \phi1/\phi T < 1.9 \tag{1a}$$

$$0.95 < \phi2/\phi T < 2.1 \tag{2a}$$

$$0.8 < \phi3/\phi1 < 1.1 \tag{3a}$$

According to the exemplary embodiments described above, compact zoom lenses can be provided which have an angle of view exceeding 80° at the wide-angle end and a smaller total lens length and are suitable for digital image pickup apparatuses with a shorter back focus.

In the exemplary embodiments described above, another lens unit which can have a smaller refractive power or a converter lens, for example, can be disposed on at least one of the object side of the first lens unit L1a–d and the image side of the third lens unit L3a–d.

Numerical data on the exemplary embodiments of the present invention are shown below. In the numerical data, Ri indicates the radius of curvature of the i-th surface (wherein i indicates the order of elements or surfaces from the object side); di indicates the lens thickness or air space distance of the i-th element; ndi indicates the refractive index of the material for the i-th element for the d-line; and νi indicates the Abbe number of the material for the i-th element.

The shape of an aspherical surface is represented by the following equation:

$$X = \frac{(1/r)H^2}{1 + \sqrt{(1 - (1+k)(H/r)^2)}} + AH^2 + BH^4 + CH^6 + DH^8 + EH^{10}$$

wherein the optical axis direction is defined as the X-axis direction, a direction perpendicular thereto is defined as the H-axis direction, the direction in which light travels is defined as a positive direction, R is a paraxial radius of curvature, k is an eccentricity, and A, B, C, D, and E are aspherical coefficients.

The symbol "E-Z," for example, refers to the -Zth power of 10, f indicates a focal length, Fno indicates an F-number, and ω indicates a half-angle of view.

Table 1 shows the resultant values of the conditions (1) to (3) in the individual exemplary embodiments.

| First Ex. Embodiment | | | |
|---|---|---|---|
| f = 2.611~3.067~4.064 | | | |
| Fno = 4.0~4.0~4.0 | | | |
| 2 ω = 81.5°~72.5°~57.9° | | | |
| R | d | nd | ν |
| 1  28.0688 | 0.6 | 1.61641 | 38.106 |
| 2  1.8 | Variable | 1 | 0 |
| 3  3.10641 | 1.9 | 1.71433 | 47.3821 |
| 4  −5.73396 | 1.3162 | 1 | 0 |
| 5  Aperture | 0.458562 | 1 | 0 |

-continued

| | | | | |
|---|---|---|---|---|
| 6 | 7.68157 | 1.2 | 1.57444 | 62.9689 |
| 7 | −1.8 | Variable | 1 | 0 |
| 8 | −2.22841 | 0.6 | 1.7552 | 27.579 |
| 9 | 16200.2 | 0.47647 | 1 | 0 |
| 10 | ∞ | 0.5 | 1.51633 | 64.1411 |
| 11 | ∞ | 1.00001 | 1 | 0 |

Zoom distance

| | | | |
|---|---|---|---|
| f | 2.611 | 3.06707 | 4.06416 |
| d2 | 2.025233 | 1.59412 | 0.8 |
| d7 | 0.3 | 0.255822 | 0.339492 |

Aspherical coefficient

| R | k | A | B | C | D | E |
|---|---|---|---|---|---|---|
| 1 | −11.0363 | −0.00034 | −5.5E−05 | −1E−06 | 0 | 0 |
| 2 | −0.59831 | −0.00298 | −0.00019 | 0.000062 | −4.5E−05 | −2E−06 |
| 3 | 0.134392 | −0.00596 | 0.00036 | −7.8E−05 | 0 | 0 |
| 4 | −8.9362 | 0.001839 | −0.00063 | 0.000212 | −3.1E−05 | 0.000004 |
| 6 | −0.15421 | 0.004923 | 0.017244 | −0.00493 | 0 | 0 |
| 7 | 1.19802 | 0.014603 | 0.03994 | −0.02893 | 0.021175 | 0.000387 |
| 8 | 1.83626 | −0.11834 | 0.036125 | −0.02762 | −0.0054 | −0.00012 |
| 9 | −8.4E+17 | −0.07975 | 0.028049 | −0.00999 | 0.001399 | 0.000033 |

Second Ex. Embodiment f = 2.080~2.600~3.640
Fno = 4.0~4.0~4.0
2 ω = 94.5°~81.7°~63.4°

| | R | d | nd | ν |
|---|---|---|---|---|
| 1 | 28.6997 | 0.6 | 1.73077 | 40.5075 |
| 2 | 1.8 | Variable | 1 | 0 |
| 3 | 2.95683 | 2 | 1.6779 | 55.3368 |
| 4 | −5.62543 | 1.43384 | 1 | 0 |
| 5 | Aperture | 0.458789 | 1 | 0 |
| 6 | 8.89569 | 1.2 | 1.58913 | 61.2659 |
| 7 | −1.84714 | Variable | 1 | 0 |
| 8 | −2.88663 | 0.6 | 1.90681 | 21.1513 |
| 9 | −1347.81 | 0.100001 | 1 | 0 |
| 10 | ∞ | 0.5 | 1.51633 | 64.1411 |
| 11 | ∞ | 1 | 1 | 0 |

Zoom distance

| | | | |
|---|---|---|---|
| f | 2.0801 | 2.6002 | 3.6402 |
| d2 | 2.88518126 | 2.27796639 | 1.21978446 |
| d7 | 0.22218574 | 0.14085117 | 0.28029468 |

Aspherical coefficient

| R | k | A | B | C | D | E |
|---|---|---|---|---|---|---|
| 1 | 23.987 | 0.00232328 | −0.0002985 | 0.000007 | 0 | 0 |
| 2 | −0.571669 | −0.0027749 | 0.00046113 | 0.000001 | −0.000079 | 0.000003 |
| 3 | −0.329116 | −0.0051857 | 0.00043668 | −0.000057 | 0 | 0 |
| 4 | −8.46424 | 0.00126147 | −0.0006554 | 0.00019463 | −0.00002 | 2.27E−07 |
| 7 | 0.49266 | −0.0037664 | 0.0599448 | −0.0741858 | 0.0274978 | 2.05E−16 |
| 8 | 0.00200948 | −0.0874501 | 0.0241313 | −0.0333846 | −0.000047 | 2.06E−16 |
| 9 | 811830 | −0.0498254 | 0.0128457 | −0.0046029 | 0.00055979 | 1.59E−16 |

Third Ex. Embodiment f = 2.53~3.26~4.08
Fno = 4.0~4.0~4.0
2 ω = 111.3°~84.1°~66.8°

| | R | d | nd | ν |
|---|---|---|---|---|
| 1 | −9.78157 | 0.6 | 1.73077 | 40.5075 |
| 2 | 1.98074 | Variable | 1 | 0 |
| 3 | 2.13337 | 1.15957 | 1.6583 | 53.4398 |
| 4 | −4.77915 | 0.699641 | 1 | 0 |
| 5 | Aperture | 0.550284 | 1 | 0 |
| 6 | 3.89885 | 1.24635 | 1.58913 | 61.2659 |
| 7 | −2.09273 | Variable | 1 | 0 |

-continued

| | | | | |
|---|---|---|---|---|
| 8 | −1.8 | 0.6 | 1.80518 | 25.4595 |
| 9 | −44.5053 | 0.1 | 1 | 0 |
| 10 | ∞ | 0.5 | 1.51633 | 64.1411 |
| 11 | ∞ | 1 | 1 | 0 |

Zoom distance

| | | | |
|---|---|---|---|
| f | 2.5299 | 3.26439 | 4.08084 |
| d2 | 1.24415588 | 0.69971609 | 0.2 |
| d7 | 0.3 | 0.45917651 | 0.76270262 |

Aspherical coefficient

| R | k | A | B | C | D | E |
|---|---|---|---|---|---|---|
| 1 | 12.4326 | −0.0093412 | 0.00149524 | 0.000094 | −2.2E−05 | 0.000003 |
| 2 | −0.52684 | −0.004151 | −0.009547 | 0.00297401 | 0.0001 | −0.00001 |
| 3 | −0.864518 | 0.00346195 | −0.0041984 | 0.00164437 | 0.001589 | 1.85E−14 |
| 4 | −16.3955 | −0.0007191 | −0.0002193 | 0.00752071 | −0.00017 | 8.28E−15 |
| 7 | 0.335605 | 0.00722941 | 0.00188683 | 0.0118424 | −0.00526 | 6.68E−15 |
| 8 | 0.457732 | −0.0921065 | 0.0379276 | 0.0336752 | −0.01453 | 5.42E−15 |
| 9 | 712.959 | −0.0768612 | 0.0378402 | −0.008061 | 0.00079 | −4.4E−14 |

Fourth Ex. Embodiment $f = 2.53 \sim 3.26 \sim 4.08$
$Fno = 4.0 \sim 4.0 \sim 4.0$
$2\omega = 111.3° \sim 84.1° \sim 66.8°$

| | R | d | nd | ν |
|---|---|---|---|---|
| 1 | −19.1227 | 0.4 | 1.62299 | 58.0589 |
| 2 | 1.62373 | Variable | 1 | 0 |
| 3 | 1.976 | 0.919162 | 1.58913 | 61.2659 |
| 4 | −3.54653 | 0.443973 | 1 | 0 |
| 5 | Aperture | 0.3 | 1 | 0 |
| 6 | 13.0016 | 0.708743 | 1.48749 | 70.4048 |
| 7 | −1.97453 | 0.1 | 1 | 0 |
| 8 | −6.32146 | 0.736349 | 1.58913 | 61.2659 |
| 9 | −3.44453 | Variable | 1 | 0 |
| 10 | −1.4232 | 0.4 | 1.68893 | 31.0749 |
| 11 | −6.22776 | 0.02 | 1 | 0 |
| 12 | ∞ | 0.5 | 1.51633 | 64.1411 |
| 13 | ∞ | 0.998181 | 1 | 0 |

Zoom distance

| | | | |
|---|---|---|---|
| f | 2.5299 | 3.26439 | 4.08084 |
| d2 | 1.12177348 | 0.66342677 | 0.2 |
| d9 | 0.35 | 0.46243261 | 0.75358285 |

Aspherical coefficient

| R | k | A | B | C | D | E |
|---|---|---|---|---|---|---|
| 1 | 49.1445 | −0.0303274 | 0.0133182 | −0.0050554 | 0.001214 | −0.00012 |
| 2 | −0.353075 | −0.0253359 | −0.0100556 | −0.0034396 | 0.0017 | 0.000012 |
| 3 | −0.306226 | −0.0176196 | −0.0192588 | −0.0070284 | 0.009058 | 1.54E−12 |
| 4 | −23.3836 | −0.0477339 | 0.0185305 | 0.0050719 | −0.00087 | 1.87E−12 |
| 8 | −17.0707 | −0.024184 | −0.0022959 | 0.0140918 | −0.0157 | 7.83E−13 |
| 9 | 4.72682 | −0.0251318 | −0.0246833 | 0.0413906 | −0.01803 | 2.08E−10 |
| 10 | −0.140216 | −0.227635 | 0.00941762 | 0.119461 | −0.04495 | 3.15E−12 |
| 11 | 14.9996 | −0.153835 | 0.0808375 | −0.012452 | −0.00141 | 0.000819 |

TABLE 1

| Conditions | | 1st Ex. Embodiment | 2nd Ex. Embodiment | 3rd Ex. Embodiment | 4th Ex. Embodiment |
|---|---|---|---|---|---|
| (1) | \|φ1/φT\| | 1.29118 | 1.37213 | 1.84944 | 1.71125 |
| (2) | φ2/φT | 1.25583 | 1.04636 | 1.75405 | 2.05539 |
| (3) | φ3/φ1 | 1.06689 | 0.831444 | 0.941173 | 0.860329 |

Next, a digital still camera (image pickup apparatus) at least one exemplary embodiment is described below with reference to FIG. 9. This digital still camera includes a zoom lens according to at least one exemplary embodiment as an imaging optical system.

In FIG. 9, the digital still camera includes a camera body 20, an imaging optical system 21 including the zoom lens according to at least one exemplary embodiment, a solid-state image pickup element (photoelectric transducer) 22, such as a CCD sensor or a CMOS sensor, incorporated in the camera body 20 to receive a subject image formed by the imaging optical system 21, a memory 23 for recording information on the subject image after photoelectric conversion by the image pickup element 22, and a viewfinder 24 including, for example, a liquid display panel to allow the observation of the subject image formed on the image pickup element 22.

Zoom lenses according to at least one exemplary embodiment can thus be applied to image pickup apparatuses such as digital still cameras to provide compact image pickup apparatuses with high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-213053 filed Jul. 22, 2005, which is hereby incorporated by reference herein in its entirety.

What is claimed is:

1. A zoom lens comprising, in order from an object side to an image side:
    a first lens unit having a negative refractive power;
    a second lens unit having a positive refractive power; and
    a third lens unit having a negative refractive power,
    wherein the second and third lens units move in zooming; and
    wherein the first, second, and third lens units each comprise one or more lenses having refractive powers of the same sign, and
    wherein the first, second, and third lens units satisfy the following conditions:

$$1.2 < \phi 1/\phi T < 2$$

$$0.9 < \phi 2/\phi T < 2.2$$

$$0.75 < \phi 3/\phi 1 < 1.2$$

wherein $\phi 1$, $\phi 2$, and $\phi 3$ are the refractive powers of the first, second, and third lens units, respectively, and $\phi T$ is the refractive power of the zoom lens at a telephoto end.

2. The zoom lens according to claim 1, wherein the one or more lenses of the third lens unit comprise a negative meniscus lens having a convex surface on the image side.

3. The zoom lens according to claim 1, wherein the second lens unit further comprises an aperture stop that moves integrally with the second lens unit in zooming.

4. The zoom lens according to claim 1, wherein the one or more lenses of the first lens unit comprise a negative lens having a concave surface on the image side.

5. The zoom lens according to claim 1, wherein the second lens unit comprises at least two positive biconvex lenses.

6. The zoom lens according to claim 1, wherein the zoom lens is configured to form an image on an image pickup element.

7. An image pickup apparatus comprising:
    a solid-state image pickup element; and
    the zoom lens according to claim 1, wherein the zoom lens is configured to form an image on the solid-state image pickup element.

* * * * *